(No Model.)
F. H. BROWN.
INDUCTION COIL.
No. 404,822. Patented June 11, 1889.
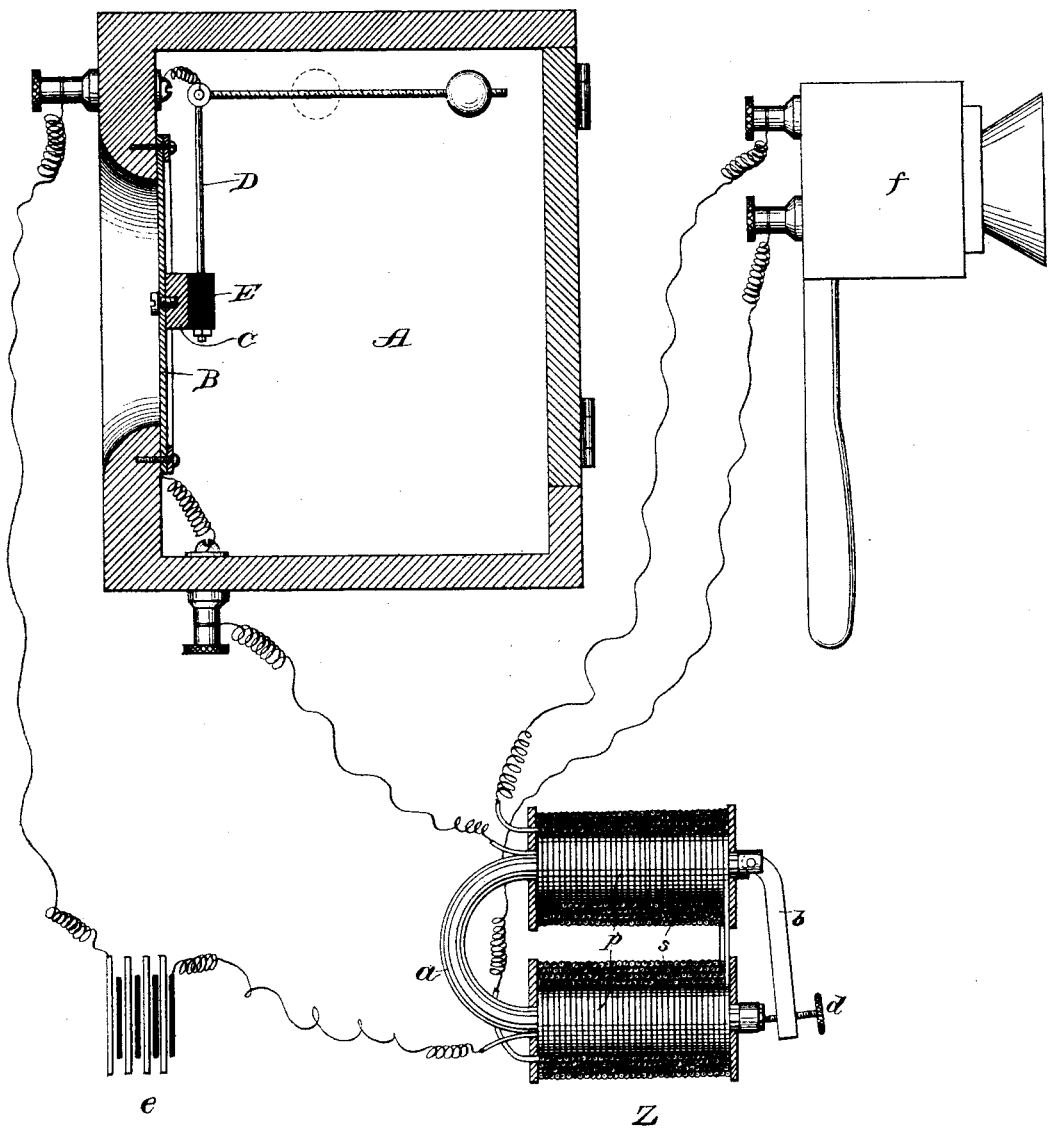
WITNESSES
Percy C. Bowen.
J. W. Garner
INVENTOR
Fred. H. Brown:
By C. A. Snow & Co
his Attorneys.

UNITED STATES PATENT OFFICE.

FRED. H. BROWN, OF FORT WORTH, TEXAS, ASSIGNOR TO THE MAGNETO TELEGRAPH COMPANY, OF NEW YORK.

INDUCTION-COIL.

SPECIFICATION forming part of Letters Patent No. 404,822, dated June 11, 1889.

Application filed September 23, 1885. Serial No. 177,932. (No model.)

*To all whom it may concern:*

Be it known that I, FRED. H. BROWN, a citizen of the United States, and a resident of Fort Worth, Tarrant county, State of Texas, have invented a new and useful Improvement in Induction-Coils, of which the following is a specification.

My invention relates to an improvement in induction-coils; and it consists in the construction and arrangement of the parts thereof, which will be more fully hereinafter described, and pointed out in the claims.

The annexed drawing is a diagram of a transmitter having my improved form of induction-coil connected in circuit therewith.

A represents a transmitter having the diaphragm B, provided with the carbon button C, and the pendulum-bar D, provided with the carbon contact-button E.

Z represents the induction-coil, the core $a$ of which is made of fine annealed soft-iron wires, and is bent in U or horseshoe shape, as shown. On the arms of the core are wound the usual primary coil $p$ and the secondary coil $s$. The ends of the primary coil are connected in circuit with the carbon contact-button and diaphragm of the transmitter, and with a battery $e$ to magnetize the soft-iron core by passing the electric current through the primary coil around the core; and the ends of the secondary coil, in which a current of electricity is induced, are connected in circuit with a receiving telephonic instrument $f$. An armature $b$, which is made of soft iron, is connected to one pole of the core at one end, and the other end of the armature extends over the opposite pole of the core, and has a brass set-screw $d$, the end of which bears on the disconnected pole of the core. By turning this screw the armature may be caused either to bear directly on the pole of the core, so as to connect both poles thereof in magnetic circuit, or the free end of the armature may be disconnected from the core, so as to break the magnetic circuit, or the armature may be brought nearly in contact with the disconnected pole of the core or removed to a considerable distance therefrom. By this construction it will be readily seen that the core is provided with means for bringing its poles together to close the magnetic circuit or separating them to any desired extent.

The strength of the induced currents depends upon the number of convolutions of wire wound within the magnetic field, the strength of the battery, and the degree of vibration of the transmitting-diaphragm. It also depends, to a great extent, upon the degree of saturation or magnetic tension of the magnet, and I learn from experiment that a given strength of current in the primary coil will induce a greater strength of current in the secondary coil, if the core of the electro-magnet is bent so as to have its poles opposite each other, than if the core be straight or bar-shaped, as has heretofore been customary in this class of instruments. I learn, further, that by bringing the poles of the core toward or from each other the intensity of the magnet is increased or diminished, accordingly as the poles approach or recede from each other. In other words, the inductive capacity of the magnet is proportioned to the nearness of its poles, and as the intensity or strength of the induced currents is as the strength of the magnet I regulate the strength of the current by bringing the extended pole or armature of the magnet nearer to or farther away from the other, and am thus enabled to proportion the strength of the current to the distance between the transmitter and the receiver, and to other varying conditions.

Changes of atmospheric conditions—such as from dry to humid, &c.—sensibly affect the operation of speaking-telephones, and it is frequently found that a telephone which will readily respond to the voice of one person will operate with but indifferent success for another person having a differently-pitched voice. A great many other conditions affect telephonic transmission, such as slight variations in the strength of the voltaic primary current and variations in the resistance of the circuit. Against these contingencies it is the object of my invention to provide, at least in a measure, and this I do by regulating the strength of the secondary or induced currents by means of my peculiar form of induction-coil, as hereinbefore fully pointed out.

Having thus described my invention, I claim—

1. The combination of the core, the primary and secondary coils wound thereon, and means for bringing the poles of the core toward or from each other, substantially as described.

2. The combination of the bent core, the primary and secondary coils wound thereon, the adjustable armature connected to one pole (to form an extension thereof) and extending over the opposite pole, and the set-screw for moving the free end of the armature toward or from the disconnected pole to establish or break the magnetic circuit, substantially as described.

In testimony that I claim the foregoing as my invention I have signed my name, in presence of two witnesses, this 14th day of August, 1885.

FRED. H. BROWN.

Witnesses:
WALTER E. KAYE,
ADDISON C. JACKSON.